United States Patent [19]
Löblich

[11] 4,217,333
[45] Aug. 12, 1980

[54] PROCESS FOR THE PRODUCTION OF POTASSIUM MAGNESIUM PHOSPHATE

[75] Inventor: Karl-Richard Löblich, Hannover, Fed. Rep. of Germany

[73] Assignee: Kali and Salz Aktiengesellschaft, Kassel, Fed. Rep. of Germany

[21] Appl. No.: 58,338

[22] Filed: Jul. 17, 1979

[30] Foreign Application Priority Data

Jul. 19, 1978 [DE] Fed. Rep. of Germany ....... 2831672

[51] Int. Cl.$^2$ .............................................. C01B 25/26
[52] U.S. Cl. ......................................... 423/306; 71/41
[58] Field of Search ...................... 423/306; 71/33, 34, 71/41

[56] References Cited

U.S. PATENT DOCUMENTS

| | | | |
|---|---|---|---|
| 3,466,161 | 9/1969 | Perlmutter et al. | 71/33 |
| 3,615,186 | 10/1971 | Jahn-Held | 423/306 |

FOREIGN PATENT DOCUMENTS

| | | | |
|---|---|---|---|
| 1265726 | 4/1968 | Fed. Rep. of Germany | 423/306 |
| 1924284 | 11/1970 | Fed. Rep. of Germany | 423/306 |

*Primary Examiner*—Wayne A. Langel
*Attorney, Agent, or Firm*—Millen & White

[57] ABSTRACT

A process for producing potassium magnesium phosphate from phosphoric acid, potassium chloride and magnesium oxide, carbonated or like alkaline magnesium compound, which comprises adding the magnesium compound to an aqueous solution of the phosphoric acid or the acidic soluble phosphate salt and an amount of potassium chloride in excess of that theoretically required, in an amount and at a rate such that the pH is maintained below 9 and a high ratio of potassium chloride to magnesium chloride is maintained in the reaction mixture, whereby the formation of tribasic magnesium phosphate is suppressed.

17 Claims, No Drawings

PROCESS FOR THE PRODUCTION OF POTASSIUM MAGNESIUM PHOSPHATE

FIELD OF THE INVENTION

This invention relates to a novel process for the production of potassium magnesium phosphate.

BACKGROUND TO THE INVENTION

The importance of magnesium as a plant nutrient has been recognized. Since many cultivated soils are poor in magnesium because of intensive cultivation, it is necessary to eliminate this deficiency by adding to the soil the magnesium-containing fertilizers. Suitable fertilizers for this purpose are mineral multiple-nutrient fertilizers which contain magnesium sulfate in addition to a source of phosphate. Magnesium-containing potash fertilizers or kieserite are also used to supply magnesium.

Potassium magnesium phosphate is a magnesium-containing fertilizer which exhibits excellent plant-physiological efficacy. It can be used either alone or as one of the components of the multiple-nutrient fertilizers. The multiple-nutrient fertilizers with a high total nutrient content are described, for example, in German Pat. Nos. 1,512,210 and 1,592,803.

Potassium magnesium phosphate exists in anhydrous form or as a monohydrate or a hexahydrate salt. Potassium magnesium phosphate hexahydrate has been produced in the prior art by reacting monobasic potassium phosphate with magnesium oxide or magnesium carbonate in the presence of water bound as water of rcystallization. Potassium magnesium phosphate hexahydrate can also be produced by reacting the Engel's salt, $MgCO_3.KHCO_3.4H_2O$, with phosphoric acid, as reported in "Gmelin's Handbuch der anorganischen Chemie" [Gmelin's Handbook of Inorganic Chemistry] 8th edition, system No. 27 [B], issue no. 4 (1939), pp. 465–466. The potassium salts used in this process must first be produced from potassium chloride in expensive processes.

According to French Pat. No. 722,378, potassium magnesium phosphate is present in the products produced by kneading calcium dihydrogen phosphate with potassium sulfate and magnesium oxide. Similarly, potassium magnesium phosphate is produced by incorporating potassium sulfate into an acidic basic composition containing calcium phosphate and magnesium phosphate. See, e.g., German Published Application No. 1,767,329. However, the product produced according to this process contains calcium sulfate as an unnecessary inert material.

German Pat. No. 619,397 teaches the production of potassium magnesium phosphate by heating potassium chloride and magnesium chloride with phosphoric acid until the evolution of hydrogen chloride is stopped. However, this process requires the use of expensive apparatus which has high corrosion resistance.

A contaminated potassium magnesium phosphate can be precipitated from seawater with the aid of sodium hydroxide. See, e.g., Japanese Pat. No. 7217.694. Similarly, contaminated potassium magnesium phosphate can be produced by the precipitation of a mixture of ammonium and potassium magnesium phosphate from seawater (Belgian Pat. No. 648,111), or by the precipitation from seawater of other compounds containing potassium magnesium phosphate (British Pat. No. 969,419).

German Unexamined Laid-Open Application, DOS No. 1,924,284 discloses a process for the production of potassium magnesium phosphate wherein magnesium oxide is reacted with phosphoric acid and potassium hydroxide. However, the potassium hydroxide is an expensive starting material because it is produced from potassium chloride in expensive processes.

Another group of the prior art processes for the production of potassium magnesium phosphate is carried out in the presence of organic amines. Thus, for example, German Pat. No. 1,265,726 discloses a process wherein potassium chloride is reacted with magnesium chloride or magnesium sulfate, and with phosphoric acid in the presence of amines to produce potassium magnesium phosphate and corresponding amine salts. The amines can be recovered from the mother liquor by boiling the latter with calcium hydroxide.

U.S. Pat. No. 3,615,186 and Belgian Pat. No. 740,307 disclose analogous processes wherein potassium sulfate is reacted with magnesium sulfate and phosphoric acid in the presence of organic amines to produce potassium magnesium phosphate. Thus, in the presence of the amines, potassium magnesium phosphate can be produced from starting materials which are relatively easily accessible. However, the use of these amines and the necessity of their subsequent recovery results in the additional equipment and capital expenditures which renders such processes expensive and technically complex.

OBJECTS OF THE INVENTION

Accordingly, it is a principal object of the present invention to provide a process for producing potassium magnesium phosphate which uses readily accessible and relatively inexpensive starting materials.

Another object is to provide a process for producing potassium magnesium phosphate of high purity.

Yet another object is to provide a process for producing potassium magnesium phosphate which requires relatively simple and inexpensive process equipment.

Upon further study of the specification and appended claims, further objects and advantages of this invention will become apparent to those skilled in the art.

SUMMARY OF THE INVENTION

In one process aspect, this invention relates to a process for the production of potassium magnesium phosphate which comprises reacting under aqueous conditions and at a pH below 9, (a) mono or dibasic magnesium phosphate, (b) potassium chloride, and (c) an alkaline magnesium compound, in the presence of less than 130 g/liter of $MgCl_2$ and other soluble magnesium compounds and in the presence of an amount of potassium chloride substantially in excess of the $MgCl_2$ and other soluble magnesium compounds, whereby the production of tribasic magnesium phosphate is suppressed.

In another process aspect, this invention relates to a process for the production of potassium magnesium phosphate by the reaction of an aqueous solution of potassium chloride containing a source of acidic phosphate ions with an alkaline magnesium compound, which comprises the steps of (a) adding under agitation to an acidic phosphate solution having a $P_2O_5$ equivalent content of 20–167 g per 1000 g of water, an amount of the alkaline magnesium compound which is approximately that required to convert the source of acidic phosphate ions to dibasic magnesium phosphate and a portion of the potassium chloride required to convert the dibasic magnesium phosphate to potassium magnesium phosphate; (b) thereafter adding thereto a further amount of potassium chloride which raises the potassium chloride content of the reaction mixture to a value from more than a K$_2$O:P$_2$O$_5$ equivalent molar ratio of 1:1 to just below the saturation point; (c) thereafter gradually adding to the thus-produced suspension the amount of alkaline magnesium compound stoichiometrically required to convert the dibasic magnesium phosphate to potassium magnesium phosphate, at a temperature below 40° C., the amounts of reactants being such that the concentration of MgCl$_2$ in the reaction mixture does bot exceed 130 g/1000 g of water; and (d) separating the thus-produced potassium magnesium phosphate from the mother liquor. In step (b) of this process aspect it is crucial to add sufficient amount of the potassium chloride to obtain in step (c) a suspension wherein the concentration of the potassium chloride is as close to the saturation point as possible. The high concentration of the potassium chloride favors the formation of the potassium magnesium phosphate and it effectively suppresses the competing formation of tribasic magnesium phosphate. Thus, the value of the molar ratio of K$_2$O:P$_2$O$_5$ of 1:1 is merely a theoretically conceivable minimum. The concentration of the potassium chloride is influenced by the initial concentration of P$_2$O$_5$ in the solution. Thus, the lower the initial concentration of P$_2$O$_5$, the higher the ratio of K$_2$O:P$_2$O$_5$ will be maintained in the solution.

DETAILED DISCUSSION

It has been discovered that potassium magnesium phosphate is metastable in the presence of soluble salts of magnesium, especially magnesium chloride, and it is converted in the aqueous solutions containing such magnesium salts to tribasic magnesium phosphate according to the equation

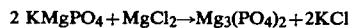
2 KMgPO$_4$ + MgCl$_2$ → Mg$_3$(PO$_4$)$_2$ + 2KCl

Accordingly, previous attempts to react phosphoric acid with potassium chloride and magnesium oxide in an aqueous medium to produce potassium magnesium phosphate have failed, unless such reactions were conducted in the presence of the reaction-controlling auxiliary agents, e.g., amines, or in the aqueous medium whose magnesium content was no greater than that of seawater (which contains about 5.8 grams of magnesium salts per 1000 grams of water).

According to the process of the present invention, potassium magnesium phosphate can be produced from acidic aqueous solutions of phosphate ions containing magnesium chloride if at all times the pH of the reaction mixture is kept below 9 and an excess of potassium chloride is present therein.

In the process of the present invention, the starting aqueous solution of phosphoric acid or acidic soluble phosphate salt and of potassium chloride preferably contains an amount of phosphate ions corresponding to 20-167 grams, most preferably 140-167 grams, of phosphorous pentoxide (P$_2$O$_5$) per 1000 grams of water. The concentration of the potassium chloride in the solution is such that molar ratio thereof to the source of acidic phosphate ions corresponds to a molar ratio of potassium oxide (K$_2$O) to P$_2$O$_5$ of at least about 1 to 1, but below the point of saturation of the potassium chloride in the solution. The ratio of K$_2$O to P$_2$O$_5$ is preferably maintained at at least 1 to 1, but preferably about 2 to 1. Most preferably the concentration of the potassium chloride should be kept as near to the saturation point thereof in the solution as possible. That saturation point, obviously, is influenced by the original content of P$_2$O$_5$ in the solution. These amounts of potassium chloride provide at all times a high molar ratio thereof to the magnesium chloride in the reaction mixture, thereby effectively suppressing the conversion of the potassium magnesium phosphate as it is formed to tribasic magnesium phosphate.

The molar ratio of potassium chloride to magnesium chloride in the reaction mixture at all times is at least 1.8:1, preferably at least 2:1, most preferably at least 2.5:1.

Phosphoric acid, potassium dihydrogen phosphate, monobasic or dibasic magnesium phosphate aqueous solutions can be used to provide the source of acidic phosphate ions. If phosphoric acid is available corresponding to a P$_2$O$_5$ concentration of 25-63% by weight, it can be diluted with a mother liquor or with washing liquids produced in the process to provide the aqueous solution containing 20-167 grams of P$_2$O$_5$ per 1000 grams of water.

Other potassium phosphate and/or magnesium phosphate solutions containing an amount of phosphate equivalent to 20-167 grams of P$_2$O$_5$ per 1000 grams of water can also be used, provided the combined magnesium and potassium contents therein provide a molar ratio of K$_2$O and/or MgO to P$_2$O$_5$ of approximately 1:1, preferably of 2:1.

To provide the potassium chloride for the aqueous solution, commercially available potassium chloride can be used or carnallite (KCl.MgCl$_2$.6H$_2$O) can be decomposed with water or with the mother liquor obtained after the potassium magnesium phosphate has been separated from the effluent of the process.

Suitable sources of the alkaline magnesium compounds are magnesium oxide and hydration products thereof and magnesium carbonate, especially in the form of the trihydrate thereof, available either as a naturally-occurring mineral (nesquehonite) or as a chemically-synthesized reagent.

In both process aspects of this invention, the alkaline magnesium compound is first added to the solution in an amount sufficient to raise the pH thereof above 6.5, and preferably to 7-7.5. Thereafter, the addition of the alkaline magnesium compound is continued, under agitation, at a rate not substantially exceeding the rate at which dibasic magnesium phosphate is converted to potassium magnesium phosphate. Thus, the ph of the solution throughout is continuously maintained below 9, thereby preventing the direct conversion of the source of acidic phosphate ions to tribasic magnesium phosphate. Accordingly, the product of the reaction contains at least 65% of the potassium magnesium phosphate and no more than 35% of the tribasic magnesium phosphate. The rate of addition of the alkaline magnesium compound is such that the pH of the solution is below 9, preferably 7-8.5, most preferably 7-7.5. The concentration of MgCl$_2$ at all times in the solution is less than 130 grams, preferably 100-110 grams, per liter of water.

During the gradual addition of the alkaline magnesium compound, the temperature of the reaction mixture should be maintained at 0°-40° C., preferably 10°-35° C.

The product of the process of this invention is potassium magnesium phosphate hexahydrate. However, as will be obvious to those skilled in the art, the amount of water present in the complex can be reduced, e.g., by heating, thereby producing the anhydrous or the monohydrate form of the potassium magnesium phosphate.

In one process aspect of the invention, the starting aqueous mixture contains mono or dibasic magnesium phosphate as a source of $P_2O_5$, an amount of potassium chloride in excess of that stoichiometrically required to convert all of the acidic phosphate ions to potassium magnesium phosphate, and, optionally, an amount of magnesium chloride and other soluble magnesium compounds which will result in a total of less than 130 g per 1 thereof in the final mixture. The mixture is agitated and a sufficient amount of an alkaline magnesium compound is gradually added thereto to raise the pH to about 6.5 but below 9. The addition of the magnesium compound to the constantly agitated solution continues at a rate not substantially exceeding the rate at which the mono or the dibasic magnesium phosphate is converted to potassium magnesium phosphate, thereby assuring that localized rises in pH to above 9 do not occur. The rate of addition of the alkaline magnesium compound is preferably such that the ph of the solution is maintained at 7-8.5, more preferably 7-7.5. The concentration of the magnesium chloride in the reaction mixture is maintained at all times at less than 130 grams per liter, preferably 100 to 110 grams per liter. Accordingly, high molar ratio of the potassium chloride to the magnesium chloride is maintained in the reaction mixture. During the gradual addition of the alkaline magnesium compound carbon dioxide escapes from the reaction mixture. After the addition of the alkaline magnesium compound is substantially completed, the mixture can be agitated for an additional 20 to 60 minutes, preferably 30 to 60 minutes, most preferably 45 to 60 minutes. It has been found that the additional agitation, after the completion of the reaction, further increases the yield of the potassium magnesium phosphate hexahydrate. The effluent obtained from the reaction contains potassium magnesium phosphate, an excess of the unreacted potassium chloride (2-3 moles, or 150-225 g, per liter of water) and a minor amount of magnesium chloride (less than 130 g, usually less than 110 g per liter of water). The potassium magnesium phosphate product is separated from the effluent in a well-known manner, e.g., vacuum-filtered, and the thus-recovered potassium magnesium phosphate is washed and dried. Stoichiometric calculations indicate that the product is a hexahydrate form of the potassium magnesium phosphate.

The mono or dibasic magnesium phosphate can either be obtained from a previous run or they can be produced in situ, e.g., by the reaction of phosphoric acid or soluble acidic phosphate salt with the alkaline magnesium compound, preferably by the addition of the alkaline magnesium compound to an aqueous solution of phosphoric acid and the required excess of the potassium chloride. More particularly, the dibasic magnesium phosphate can be produced in situ, e.g., by adding magnesium oxide to a solution of phosphoric acid and a portion of the potassium chloride required to convert all of the phosphoric acid to potassium magnesium phosphate. The amount of the magnesium oxide added is that which is stoichiometrically required to convert the phosphoric acid to the dibasic magnesium phosphate. Thereafter, the remainder of the potassium chloride is added to the reaction mixture and then the remainder of the magnesium oxide is gradually added at a rate and under the conditions specified above.

The monobasic magnesium phosphate can be produced in situ, e.g., by adding, to a solution of phosphoric acid, magnesium sulfate and at least one of calcium hydroxide and calcium carbonate, thereby producing calcium sulfate and monobasic magnesium phosphate. The calcium sulfate is then removed from the solution. The amounts of the calcium hydroxide, calcium carbonate and magnesium sulfate added to the solution are such that, after the calcium sulfate is removed, the solution contains only the monobasic magnesium phosphate which is then converted to dibasic magnesium phosphate with magnesium oxide or carbonate or other alkaline magnesium compound.

In another process aspect of this invention, the process is conducted in several consecutive steps. In the first step, the alkaline magnesium compound and the potassium chloride are added under agitation to an acidic phosphate solution containing 20-167 grams of $P_2O_5$ per 1000 grams of water. The amount of the alkaline magnesium compound added is that which is stoichiometrically required for the formation of dibasic magnesium phosphate and the amount of the potassium chloride is a portion only of the amount of the potassium chloride required to convert all of the phosphate ions to potassium magnesium phosphate. Then, a further amount of the potassium chloride is added to the reaction mixture, whereby the total potassium chloride content in the mixture is raised so that an equivalent molar ratio of $K_2O:P_2O_5$ in the reaction mixture ranges from more than 1:1 to just below the saturation point of potassium chloride in the mixture. In the next step, an alkaline magnesium compound is gradually added to the mixture, under agitation, in an amount which is stoichiometrically required to convert the dibasic magnesium phosphate to potassium magnesium phosphate. The reaction mixture is maintained throughout the reaction at a temperature below 40° C., preferably 20°-35° C. the potassium magnesium phosphate hexahydrate product is separated from the mother liquor, washed with water, and dried.

More particularly, in the first step, a portion only of the total amount of potassium chloride required to convert all of the phosphate ions to potassium magnesium phosphate is introduced into the aqueous acidic solution containing 20-167 grams of $P_2O_5$ per 100 grams of water. The amount of the potassium chloride in the solution can almost reach the saturation point of potassium chloride.

Then, an alkaline magnesium compound is added to the solution until the pH thereof rises to about 6.0-6.5. The amount of the magnesium compound added is that which is stoichiometrically required to produce dibasic magnesium phosphate. The alkaline magnesium compound added in this step of the process need not be in a form which renders it highly reactive. Suitable compounds are, e.g., magnesium oxide or the hydration products thereof, and magnesium carbonate, especially in the form of the naturally occurring trihydrate mineral, the nesquehonite.

After the addition of the alkaline magnesium compound in the first step is completed, an alkaline magnesium compound in a form which renders it highly reactive is added extremely gradually to the reaction mixture under very vigorous agitation, for example, with a turboagitator. Suitable alkaline magnesium compounds in highly reactive form used in this step are finely divided magnesium oxides, e.g., having an iodine number of above 20, and pulverized to a fine floury consistency.

During the gradual addition of the highly reactive alkaline magnesium compound, the pH of the solution rises to 7.0–7.5 and it remains at this level if the addition of the alkaline magnesium compound takes place at a rate most favorable for conducting the process of the invention. If the alkaline magnesium compound is added more rapidly, the pH of the solution rises considerably. However, the pH should not exceed 9 because at a pH of 9 and above, tribasic magnesium phosphate is produced instead of the desired potassium magnesium phosphate. The pH can be maintained at the value of less than 9 if magnesium carbonate, especially in the form of the nesquehonite, ($MgCO_3.3H_2O$), is used.

The concentration of magnesium chloride in the solution may not exceed 130 g of $MgCl_2$ per 1000 grams of water, since at the concentration of 130 grams or more of $MgCl_2$ per 1000 grams of water, the potassium magnesium phosphate hexahydrate product is contaminated with a substantial amount of tribasic magnesium phosphate.

It is also important to maintain the temperature of the mixture at between 0° and 40° C. in that step of the process wherein the alkaline magnesium compound in the highly reactive form is added thereto. The concentration of the potassium chloride in the mixture during at least this step of the process must be such that the equivalent molar ratio of $K_2O:P_2O_5$ is greater than 1:1, but just below the saturation point of the potassium chloride in the mixture. To maintain the concentration of the potassium chloride at this level, partial amounts of the total potassium chloride required to convert all of the phosphate ions to the potassium magnesium phosphate are repeatedly added to the reaction mixture. Potassium chloride which contains up to 8% by weight of sodium chloride can be used in all steps of the process.

After the addition of the highly reactive alkaline magnesium compound has been completed, it is preferred to agitate the mixture for an additional 20 to 60 minutes, preferably 30 to 60 minutes, most preferably 45 to 60 minutes, at a temperature of 0°–40° C. The additional agitation further increases the yield of the potassium magnesium phosphate hexahydrate. The potassium magnesium phosphate hexahydrate which is continuously crystallized from the reaction mixture is separated from the mother liquor, washed and dried.

In both process aspects of this invention, a portion of the mother liquor can be recycled as a diluent for concentrated phosphoric acid to the initial step of the process of this invention, or it can be used to decompose carnallite to produce the potassium chloride required for the process of this invention.

In both aspects of the present invention the mother liquor, obtained after the product has been separated, may not contain more than 0.1 grams of $P_2O_5$ per 1000 grams of $H_2O$, nor more than 130 grams of $MgCl_2$ per 1000 grams of $H_2O$, preferably 100–110 grams of $MgCl_2$ per 1000 grams of water, if the process is carried out under the proper conditions.

The potassium content in the potassium magnesium phosphate product obtained according to both aspects of the present invention is about 65% to about 95%.

The process of this invention is conducted in a relatively technically non-complex manner and it uses readily accessible starting materials to produce potassium magnesium phosphate substantially free of impurities. The product can be used as an effective magnesium fertilizer with substantially no or very little additional processing. The amount of phosphorous pentoxide used in the process is converted substantially completely to the desired product. The mother liquor can be recycled, at least partially, to the process, or it can be used to decompose carnallite, thereby producing potassium chloride required for the process.

Without further elaboration, it is believed that one skilled in the art can, using the proceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

415.1 g of artificial nesquehonite ($MgCO_3.3H_2O$) is gradually introduced into 156 g of a solution containing 340 g of KCl and 196 g of $H_3PO_4$ in 1000 g of $H_2O$, which is kept under vigorous agitation and whose temperature is maintained at 25° C. with the aid of a thermostat. During the reaction, $CO_2$ escapes. The introduction of the artificial nesquehonite takes approximately one-half hour in order to keep the pH below 9. After the addition of the artificial nesquehonite is completed, the mixture is agitated for another hour, the producing mother liquid containing 202 g of KCl and 87.5 g of $MgCl_2$ per 1000 g of $H_2O$. Potassium magnesium phosphate precipitate is vacuum-filtered and washed. After drying at 40° C., 527 g of the product is obtained whose analysis yields 16.5% $K_2O$; 15.9% MgO; and 27.0% $P_2O_5$. Heating the product to 100° C. releases about 178 g of water of crystallization whereby the $K_2O$ content increases to 24.9%. The potassium content is 93.2% of theoretical.

EXAMPLE 2

A solution, obtained from a previously-conducted experiment, contains 113.7 g of $Mg(H_2PO_4)_2$; 277.8 g of KCl, and 84.3 g of $MgCl_2$ per 1000 grams of $H_2O$. Under the conditions of Example 1, i.e., vigorous agitation and a temperature of 25° C., 144.1 g of $MgCO_3.3H_2O$ is gradually introduced into 1426 g of this solution; here again, $CO_2$ escapes. After about 2 hours, the mother liquor contains 182.2 g of KCl and 121.2 g of $MgCl_2$ in 1000 g of water. This product is vacuum-filtered, washed, and dried at 40° C., thus obtaining 264 g of potassium magnesium phosphate. The product contains 12.3% $K_2O$; 18.6% MgO; 28.0% $P_2O_5$; and 41.0% water of crystallization. The potassium content is 69.5% of theoretical.

EXAMPLE 3

Crude phosphate ore (30.6% $P_2O_5$ and 49.7% CaO) is refined by the addition thereto of kieserite meal ($MgSO_4.2H_2O$) and aqueous phosphoric acid and separating the thus-produced gypsum (calcium sulfate dihydrate). From 100 g of the crude phosphate ore and 142 g of phosphoric acid, there is obtained 1208 g of combined dressing solution and washing water. This combined phosphate solution containing, in addition to several impurities, 190.7 g of $Mg(H_2PO_4)_2$ in 1000 g of $H_2O$, is employed as the starting solution for the process of this invention. In addition, about 250 g of washed solution residue consisting primarily of gypsum, is obtained in the moist state with 2.72% $P_2O_5$ content.

1208 g of the thus-produced phosphate solution is combined with 331 g of KCl. Under vigorous agitation, 245.4 g of $MgCO_3.3H_2O$ is then gradually introduced while keeping the temperature at 35° C. with the aid of a thermostat. After 90 minutes, the mother liquor reaches $MgCl_2$ content of 84 g in 1000 g of water. Potassium magnesium phosphate is separated from the mother liquor and it is then washed. The KCl content of the mother liquor is 216 g. The washed product weighs 470 g after drying at 40° C. The product contains: 16.8% $K_2O$; 15.7% MgO; 26.9% $P_2O_5$; and 40.5% water of crystallization. The potassium content is 94.9% of theoretical.

17.7% of the $P_2O_5$ content of the product is from the crude phosphate. Of the total phosphate, 5.3% is lost with the separated gypsum.

In the mode of operation according to this example, the phosphoric acid entering the solution and the $MgCO_3.3H_2O$ are utilized substantially to an extent of 100%. The product contains 37.8% of the total potassium employed; the remainder of the potassium is in the mother liquor as the excess of potassium chloride. The mother liquor is subsequently worked up to recover the excess KCl.

EXAMPLE 4

1.89 Metric tons (t) of a technical grade phosphoric acid containing 24.2% of $P_2O_5$, or 0.915 t of a technical phosphoric acid containing 50% of $P_2O_5$, is diluted with 2.81 t of washing water obtained from the purification of the potassium magnesium phosphate product form the preceding batch. The washing water contains 0.143 t of KCl, 0.014 t of NaCl, and 0.083 t of $MgCl_2$ dissolved in 2.57 t of $H_2O$. The solution is reacted with ground, natural magnesite, artificial nesquehonite or with caustic magnesium oxide or hydration products thereof, or with mixtures of one or more of these magnesium compounds with the further addition of a sufficient amount of water to obtain 4.77 t of to a solution (L 1) having the composition:

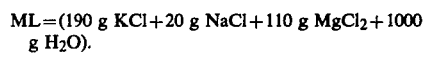
$L1 = 183.7\ g\ Mg(H_2PO_4)_2 + 37.3\ g\ KCl + 3.8\ g\ NaCl + 21.7\ g\ MgCl_2 + 1000\ g\ H_2O$.

When caustic magnesium oxide or ground natural magnesite is used, technical phosphoric acid containing as little as 25% $P_2O_5$ can be used. It is obvious that the lower the concentration of $P_2O_5$ in the phosphoric acid used, the less water will be needed to dilute the phosphoric acid to the desired $P_2O_5$ concentration.

4.77 t of this solution is allowed to flow continuously into a throughflow vessel equipped with a disperser. To the vessel, there is also continuously added 0.13 t of finely divided, active magnesium oxide, 0.95 t of technical grade potassium chloride containing 60% $K_2O$, and 5.6 t of the motor liquor from the preceding potassium magnesium phosphate batch. Within 15–20 minutes, 11.45 t of a suspension of dibasic magnesium phosphate and the unreacted or not completely reacted reactants in the reaction solution (L 2) is discharged from the throughflow vessel after an average residence time of 2 minutes.

The 11.45 t of the suspension from the diperser-throughflow vessel is then added to a stirrer vessel, operated in a batchwise fashion, which contains 0.56 t of potassium magnesium phosphate product in 3.3 t of mother liquor from the previous batch.

Thereafter, 0.131 t of finely divided, active magnesium oxide (produced by roasting alkaline magnesium carbonate at 720° C.) is gradually added to the stirrer vessel, to raise the pH of the solution to between about 7.0 and 8.5. The introduction and stirring of the magnesium oxide into the suspension in the agitator unit requires more time than the introduction of the 11.45 t of the suspension from the stirrer vessel. Depending on the consumption rate of the caustic magnesia, 20–40 minutes is required.

After the addition of the magnesium oxide has been completed, the batch is agitated for another 30 minutes for maturing purposes. During the entire reaction time, the stirrer vessel is maintained at a temperature of 32° C. by means of heat exchangers. The vessel contains 15.44 t of the suspension.

At the end of the maturation period, the crystallization of the potassium magnesium phosphate hexahydrate is substantially finished. At this time, 11.58 t of the product suspension is withdrawn from the agitator-equipped vessel; 3.86 t is left in the vessel as a charge for the next batch.

The 11.58 t of the product suspension is conducted through a clarifier, from which 3.30 t of a clarified mother liquor (ML) is discharged. The composition of the clarified mother liquor is:

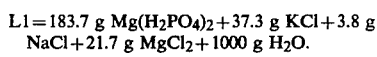
$ML = (190\ g\ KCl + 20\ g\ NaCl + 110\ g\ MgCl_2 + 1000\ g\ H_2O)$.

This mother liquor is passed on to further processing to recover KCl.

The thickened suspension obtained from the clarifier is filtered, thereby yielding 5.60 t of mother liquor (ML) which is recycled to the reaction in the disperser-throughflow vessel for the next batch to serve as a diluent.

2.68 t, calculated on wet basis, of the filter cake from a filter 1, is stirred in together with the filtrate from filter 3 in the mixing vessel 1 and vacuum-filtered via filter 2. The filtrate from filter 2 represents the washing water which, in the next batch, serves as the diluting water for the phosphoric acid.

The filter cake from filter 2 is mixed with water in the mixing vessel 2 and vacuum-filtered to the dry state in filter 3, whereupon water is added. The filtrate passes on to mixer (mash tube) 1. From the filter 3, 2.53 t of a moist product is obtained, which, after calcination to the monohydrate form, gives 1.15 t of a product containing 23.6% $K_2O$; 23.9% MgO; 39.8% $P_2O_5$; 0.42 Cl; and 12.1% water of crystallization. The potassium content of the potassium magnesium phosphate monohydrate product is 88.4% of theoretical.

The phosphoric acid used in the process is present substantially to an extent of 100% in the product. Of the total amount of the MgO used in the process, 70.3% is present in the product, the remainder having been converted to $MgCl_2$ by reaction with chlorine ions from the KCl. Of the total amount of the potassium chloride used in the starting mixture, only 47.6% is found in the product. The remainder of the potassium chloride is in the 3.3 t of the mother liquor (ML) discharged for further processing, which contains 0.473 t of KCl; 0.275 t of $MgCl_2$; and 2.5 t of water.

It can be seen from Example 4 that the process of the present invention can be operated continuously if the potassium magnesium phosphate stirrer vessel used in the batch process (Examples 1–3) is replaced by a stirrer vessel cascade, and if the disperser-throughflow vessel, operated continuously in a batchwise fashion, is continuously charged. The stirrer vessel and the stirrer vessel cascade, used in the batch and in the continuous processes, respectively, are necessary to give potassium magnesium phosphate time to mature.

EXAMPLE 5

Potassium chloride, suitable for use in the process of this invention, can be obtained as a product of decomposition of carnallite with water or preferably with mother liquors obtained in the production of potassium magnesium phosphate. Such mother liquors typically contain potassium chloride and magnesium chloride.

At 25° C., 1 t of carnallite decomposed with 0.51 t of water yields 0.227 t of potassium chloride and 1.283 t of residue liquor ($E_{25}$), which contains 0.0409 t of KCl, 0.343 t of $MgCl_2$, and 0.899 t of $H_2O$. The residue liquor is discharged. The KCl yield is thus 84.8%.

The potassium magnesium phosphate process, carried out according to the procedure of Example 4, with substantially pure potassium chloride obtained from the carnallite, yields mother liquor (ML) having the composition:

$$ML=(190 \text{ g KCl}+110 \text{ g MgCl}_2+1000 \text{ g H}_2O).$$

For the decomposition of 1 t of carnallite at 25° C., 0.933 t of the mother liquor is required; the yield is 0.3545 t of potassium chloride and 1.578 t of a residue liquor ($E_{25}$). The 1.578 t of the residue liquor ($E_{25}$) contains 0.0504 t of KCl and it is discharged. Potassium chloride yield from the decomposition reaction is 87.6%. If the potassium chloride loss is calculated to take into account the normal loss rate of 15.2% attributed to the carnallite decomposition, then the loss of the potassium chloride is only 7% and, accordingly, yield thereof is 93% on the basis of the total of the potassium chloride introduced with the solution (ML).

To obtain 1 t of potassium magnesium phosphate product containing 23.6% $K_2O$, it is necessary to use 0.784 t of potassium chloride. This process also yields 2.826 t of mother liquor (ML). This amount of mother liquor is used to decompose 3.03 t of carnallite, thereby yielding 1.074 t of potassium chloride and 4.78 t of a residue liquor ($E_{25}$).

The residue liquor ($E_{25}$) also contains 0.1527 t of KCl, of which 0.1239 t is attributed to the normal decomposition loss. Hence, 0.0288 t of KCl is thus additionally lost due to the use of the mother liquor (ML) instead of water for the decomposition of carnallite. When this potassium chloride is used in the $KMgPO_4$ process of this invention, potassium yield in the product is 96.3%, if based on the decomposition of potassium chloride, or about 80%, if based on the potassium content of the carnallite.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of potassium magnesium phosphate by the reaction of an aqueous solution of a source of acidic phosphate ions and potassium chloride with an alkaline magnesium compound which comprises the steps of:
   (a) adding under agitation to an acidic phosphate solution having a $P_2O_5$ equivalent content of 20–167 g per 1000 g of water an amount of the alkaline magnesium compound which is approximately that required to convert the source of acidic phosphate ions to dibasic magnesium phosphate and a portion of the potassium chloride required to convert the dibasic magnesium phosphate to potassium magnesium phosphate;
   (b) thereafter adding thereto a further amount of potassium chloride which raises the potassium chloride content of the reaction mixture to a value from more than a $K_2O:P_2O_5$ equivalent molar ratio of 1:1 to just below the saturation point;
   (c) thereafter gradually adding to the thus-produced suspension the amount of alkaline magnesium compound stoichiometrically required to convert the dibasic magnesium phosphate to potassium magnesium phosphate, at a temperature below 40° C., the amounts of reactants being such that the concentration of $MgCl_2$ in the reaction mixture does not exceed 130 g per 1000 g of water; and
   (d) separating the thus-produced potassium magnesium phosphate from the mother liquor.

2. A process according to claim 1, wherein the thus-produced potassium magnesium phosphate is washed with water and dried.

3. A process according in claim 2, wherein the starting acidic phosphate solution is a mixture of a phosphoric acid of 25–63% by weight $P_2O_5$ content and a corresponding amount of the mother liquor and wash water obtained from a preceding run.

4. A process according to claim 1, wherein the starting acidic phosphate solution is a magnesium phosphate solution having magnesium and potassium contents equivalent to a molar ratio of $K_2O$ and/or $MgO$ to $P_2O_5$ of about 1:1.

5. A process according to claim 1, wherein the alkaline magnesium compound is one or more of magnesium oxide and the hydration products thereof.

6. A process according to claim 1, wherein the alkaline magnesium compound is magnesium carbonate trihydrate.

7. A process according to claim 1, wherein the potassium chloride is obtained by the decomposition of carnallite with the mother liquor obtained from a preceding run.

8. A process according to claim 1, wherein after the addition of the alkaline magnesium compound is terminated, the reaction mixture is stirred for another 30 minutes at a temperature of 0°–40° C.

9. A process according to claim 1, wherein at least a portion of the mother liquor obtained after the potassium magnesium phosphate is separated from the reaction mixture, is recycled and used to form the starting aqueous solution for another run.

10. A process for the production of potassium magnesium phosphate which comprises reacting under aqueous conditions and at a pH below 9 (a) mono or dibasic magnesium phosphate, (b) potassium chloride, and (c) an alkaline magnesium compound, in the presence of less than 130 g per liter of $MgCl_2$ and other soluble magnesium compounds and in the presence of an amount of potassium chloride substantially in excess of the $MgCl_2$ and other soluble magnesium compounds, whereby the production of tribasic magnesium phosphate is suppressed.

11. A process according to claim 10, wherein the mono or dibasic magnesium phosphate is produced in situ by the addition of the alkaline magnesium compound to a solution of phosphoric acid and potassium chloride.

12. A process according to claim 11, wherein magnesium oxide is added to a solution of phosphoric acid and a portion of the potassium chloride required to convert all of the phosphoric acid to potassium magnesium phosphate, in an amount about stoichiometrically required to convert the phosphoric acid to dibasic magnesium phosphate, the remainder of the potassium chloride is added to the reaction mixture, and then the remainder of the required amount of magnesium oxide for the conversion of the dibasic magnesium phosphate to potassium magnesium phosphate is added to the reaction mixture.

13. A process according to claim 10, wherein the mono or dibasic magnesium phosphate is produced in situ by the reaction of phosphoric acid or soluble acidic phosphate salt with the alkaline magnesium compound.

14. A process according to claim 10, wherein the alkaline magnesium compound is added to a solution or a suspension of the mono or dibasic magnesium phosphate.

15. A process according to claim 10, wherein the rate of addition of (c) is such that the pH of the solution is maintained at about 7–7.5.

16. A process according to claim 10, wherein the rate of addition of (c) is such that the concentration of magnesium chloride in the reaction mixture is maintained at about 100 to 110 grams per liter of water.

17. A process according to claim 10, wherein the starting source of acidic phosphate ions is monobasic magnesium phosphate, which is produced in situ by the addition to a solution of phosphoric acid of magnesium sulfate and at least one of calcium hydroxide and carbonate and the thus-obtained calcium sulfate is separated from the reaction mixture prior to the production of the potassium magnesium phosphate.

* * * * *